(12) United States Patent
Reid et al.

(10) Patent No.: US 6,207,612 B1
(45) Date of Patent: Mar. 27, 2001

(54) REMOVAL OF IMPURITIES FROM HYDROCARBON STREAMS

(75) Inventors: John S. Reid, Wooster; Thomas Szymanski, Hudson, both of OH (US)

(73) Assignee: Norton Chemical Process Products Corporation, Stow, OH (US)

( * ) Notice: Subject to any disclaimer, the term of this patent is extended or adjusted under 35 U.S.C. 154(b) by 0 days.

(21) Appl. No.: 09/476,898

(22) Filed: Jan. 3, 2000

(51) Int. Cl.⁷ .............................. B01J 20/00; B01J 21/16; B01J 23/02; B01J 23/08; C10G 1/00
(52) U.S. Cl. ............................ 502/415; 502/81; 502/341; 502/355; 423/139; 423/265; 423/275; 423/DIG. 14
(58) Field of Search ............................ 502/415, 355, 502/341, 84; 423/139, 265, 275, DIG. 14

(56) References Cited

U.S. PATENT DOCUMENTS

| | | | |
|---|---|---|---|
| 3,468,625 | * | 9/1969 | Nightingale et al. ............... 502/415 |
| 3,862,054 | * | 1/1975 | Sokolsky et al. ..................... 502/84 |
| 3,992,329 | * | 11/1976 | Eaton et al. ............................ 502/7 |
| 4,147,665 | * | 4/1979 | Ikari et al. ........................... 502/415 |
| 4,166,100 | * | 8/1979 | Vorobiev et al. .................... 423/626 |
| 4,224,191 | * | 9/1980 | Bishop, III .......................... 502/415 |
| 4,376,103 | * | 3/1983 | Bertolacini et al. ............ 423/244.11 |
| 4,571,445 | * | 2/1986 | Slaugh ................................. 585/852 |
| 4,923,843 | * | 5/1990 | Saforo et al. ........................ 502/415 |
| 5,268,091 | * | 12/1993 | Boitiaux et al. .................. 208/251 R |
| 5,389,240 | | 2/1995 | Gillespie et al. .................... 208/226 |
| 6,013,600 | * | 1/2000 | Kanazirev ........................... 502/415 |
| 6,074,984 | * | 6/2000 | Demmel et al. ..................... 502/439 |

* cited by examiner

Primary Examiner—Mark L. Bell
Assistant Examiner—Patricia L. Hailey
(74) Attorney, Agent, or Firm—David Bennett

(57) ABSTRACT

The invention provides media for absorption of phosphate and metal contaminants from a hydrocarbon stream and a method of making such media. The media comprise alumina with relatively minor amounts of calcia and magnesia and are made by a process in which the minor components or precursors of such components are dispersed in a gelled sol of a hydrated alumina such as boehmite.

10 Claims, 2 Drawing Sheets

REMOVAL OF IMPURITIES FROM HYDROCARBON STREAMS

BACKGROUND OF THE INVENTION

The present invention relates to the treatment of crude hydrocarbon streams and particularly to an adsorbent material that is effective to remove troublesome components often present in such streams.

In the production of oil from underground sources, after a well has been drilled to tap into the oil-bearing rock formations, it is often necessary to break up the formations to allow the oil to flow to the well bore. This is accomplished by the use of "frac fluids" which, as the name implies, have the purpose of fracturing the rock formations in which the oil is located. These frac fluids are often based on a hydrocarbon carrier liquid and contain proppants and phosphate derivatives as gelling agents to ensure that the frac fluids do not become widely dispersed in the formations but stay adjacent the well bore. The frac fluids are pumped into the well under pressure sufficient to accomplish the above purpose and are then pumped out of the well for re-processing. However such removal is not usually complete and at least a portion of the crude extracted from the well will be contaminated by the phosphate derivatives.

The frac fluids may also be contaminated by metal values which are also present in many phosphate-containing gelling agents and the removal of such metal values is desirable since they can poison catalysts used in subsequent refining components of the refinery or be deposited in the equipment used to further process the oil. The phosphate contaminants are particularly undesirable since they are often in an acidic form or a polymerized form that either lead to corrosion damage to distillation or other refining equipment in an oil refinery unless expensive stainless steel materials are used, or cause the deposition of gummy residues that interfere with the efficient operation of the refinery components.

The "sweetening" of an oil, that is the removal of sulfur-containing contaminants such as mercaptans, is carried out by an oxidation process conducted in an alkaline environment. A desirable preliminary to such a process is the removal of naphthenic acid values from the oil to be "sweetened" and a method for the accomplishment of this removal is described in U.S. Pat. No. 5,389,240. This patent teaches passing the oil through a bed of a solid solution of at least one divalent metal oxide selected from alkaline earth metal oxides, and the oxides of cobalt, iron, nickel and zinc, and aluminum oxide. One example of such a material is hydrotalcite An adsorbent medium has now been developed that provides improved performance over the materials described in the prior art in terms of its ability to absorb metal values, phosphate derivatives and acids. These capabilities can also be provided in the form of porous shaped media suitable for incorporation in a tower adapted for continuous operation with sufficient crush strength to withstand loading and recycling operations.

SUMMARY OF THE INVENTION

The absorbent media of the invention comprise from 50 to 96% by weight of alumina and from 50 to 4% by weight of alkaline earth metal oxides selected from calcia and magnesia in CaO:MgO proportions by weight of from 90:10 to 50:50, and have a BET surface area of at least 100 $m^2$/gm.

The term "absorbent" as used herein is intended to cover activities in which an impurity in a hydrocarbon flow is physically trapped within the pores of the medium, adsorbed on to the surface of the pores of the medium, or reacts chemically with the material of the medium to produce components that are not further transported by the flow of which the impurity was a component.

The proportions of the components are calculated of the basis of the weights of components added initially stoichiometrically adjusted to the oxides that remain after firing to produce the media of the invention. In general terms this gives a reasonably accurate translation as can be seen from the following chart.

| Boehmite | $CaCO_3$ | $MgCO_3$ | → | $Al_2O_3$ | CaO | MgO |
|---|---|---|---|---|---|---|
| 90 | 8.2 | 1.8 | | 92.2 | 6.6 | 1.2 |
| 60 | 36 | 4 | | 65.9 | 31.1 | 3.0 |
| 96 | 3.6 | 0.4 | | 97.1 | 2.6 | 0.3 |
| 96 | 2.0 | 2.0 | | 97 | 1.6 | 1.4 |

The first three formulations were made using dolomitic limestone and the fourth used plain dolomite. As can be seen the relative proportions do not change very significantly when going from the precursor materials to the final fired product.

The media can have any desired shape depending on the application. They can for example be in the form of short rods or pellets, hollow cylinders, rings, saddles and the like. A particularly useful shape is described in U.S. Pat. No. 5,304,423. Alternatively they can have the form of monoliths with multiple through passages that can be assembled into beds. Such monolith media are however often less preferred for applications such as those primarily intended for the media of the present invention.

The invention further comprises a method of making such media which comprises a) forming an aqueous slurry mixture of from 50–97% by weight of a hydrated alumina component, such as for example a boehmite, with from 50 to 3% by weight of a mixture of calcium carbonate and magnesium carbonate wherein the relative weight proportions of the calcium and magnesium carbonates are from 10:1 to 50:50, the weights of the boehmite and carbonate mixture being based on the solids weight in the slurry;

b) peptizing the slurry by addition of an acid;

c) extruding the peptized slurry to form the desired media shapes; and d) drying to remove water and then firing the shapes at a temperature of 650 to 850° C.

The hydrated alumina component can be selected, for example, from any of the commercial boehmite products which are commonly assigned the formula AlOOH or more accurately $Al_2O_3.H_2O$.

The mixture of calcium and magnesium carbonates is conveniently supplied by a powdered form of dolomite or preferably dolomitic limestone, which is a mixture of dolomite, (in which the calcium and magnesium metal atoms are present in nominally equal numbers) and calcite, with the calcite predominating and a few percentage points of impurities such a s silica and iron. When calcined during the firing stage this mixture decomposes to the respective oxides. The products of the invention could therefore, in theory, be made by incorporating the oxides or hydroxides into the boehmite slurry. This would however require more acid to peptize the slurry and thus is a less preferred option.

To aid dispersion of the carbonates in the boehmite sol, it is preferred that they be supplied in the form of a powder of about 50 microns average particle size or finer. A commercial dolomitic limestone that is commercially available from National Lime and Stone Company under the trade name Bucyrus Microfine, (99% passing through 325 mesh screen), is particularly suitable. This material contains the calcium and magnesium carbonates in a roughly 6:1 weight ratio The acid added to cause peptization of the slurry, which is essentially a dispersion of the calcium/magnesium-containing component in a boehmite sol, can be any of those generally know to peptize such sols. Because the firing would lead to decomposition of the acid, it is preferred that mineral acids such as nitric, hydrochloric or sulfuric acids be avoided and a strong organic acid such as acetic or, better, formic acid is used to cause peptization. The peptized sol in effect becomes a stable gel which can be formed, for example by extrusion, to produce shapes that will retain their shape during drying and firing. Enough is preferably added to reduce the pH to 5 or lower.

The drying of the shapes is preferably carried out under conditions that will allow the water to be removed without disruption of the shape. This implies drying at a fairly low temperature of about 100° C. (though up to 50° C. higher can be used in most circumstances) for prolonged periods of up to two days though usually a drying period of 10–24 hours is adequate.

Firing of the dried shapes should be long enough to form calcium and magnesium oxides from their respective carbonates and to drive off any bound water and convert the boehmite to the gamma alumina form of some other intermediate allomorph or amorphous form. It is however preferred that the firing should not be under conditions that would lead to the formation of the alpha form or sintering since this leads to a loss of porosity and leaves the alumina in a less active form. The firing temperature therefore is preferably at a maximum temperature of from 500 to 800° C. and for a period until no further loss of weight occurs. Generally heating at the firing temperature for 30 minutes to 5 hours is enough to decompose essentially all the carbonate and drive off all the bound water.

The surface area of the fired product is at least 100 $m^2/gm$ such as above about 200 $m^2/gm$ and preferably from 200 to 250 $m^2/gm$.

DETAILED DESCRIPTION OF THE DRAWINGS

DETAILED DESCRIPTION OF THE PREFERRED EMBODIMENTS

Figure 1:
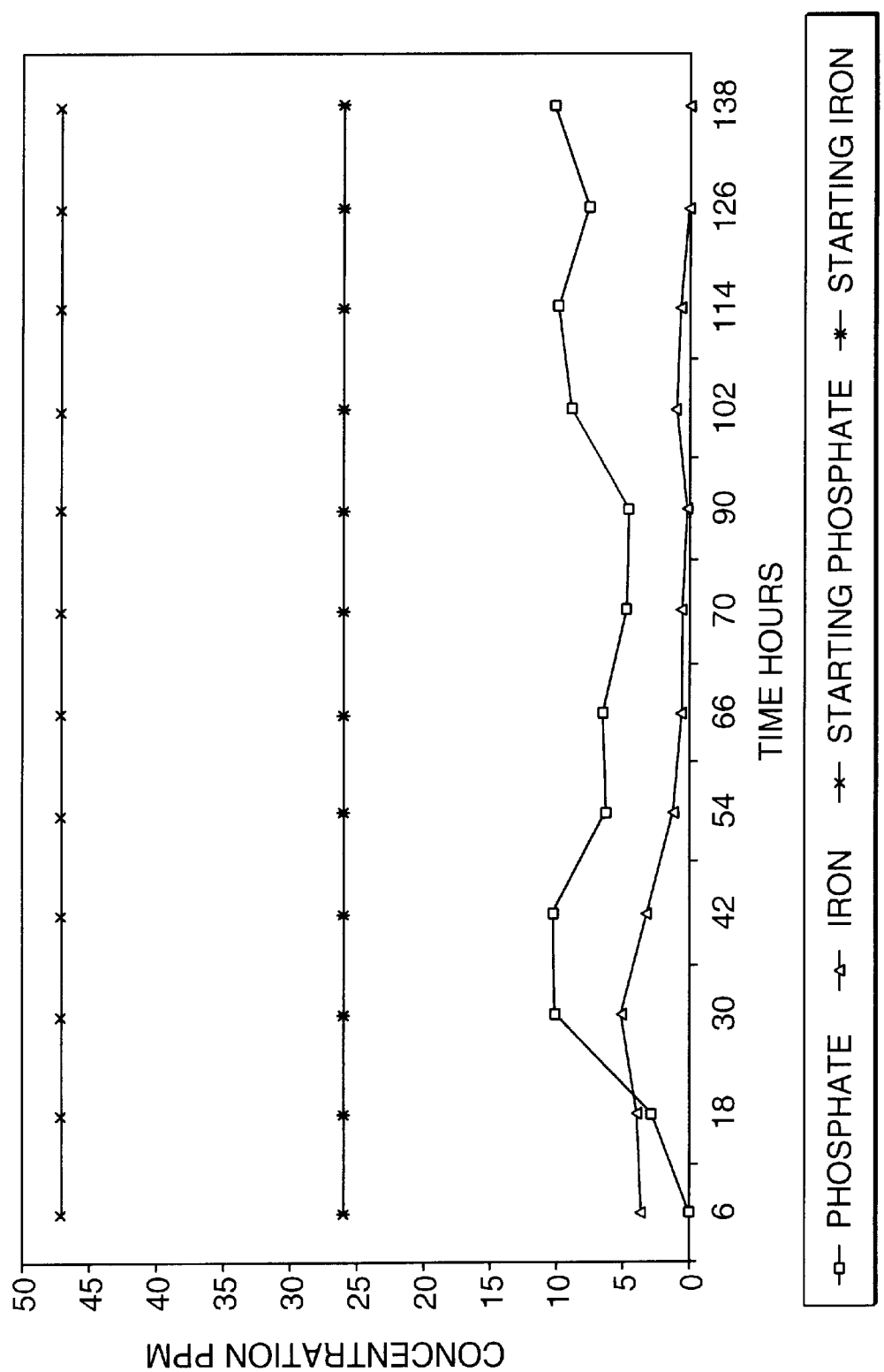
FIG. 1 is a graph showing the variation of phosphorus and iron content over time while distilling contaminated oil in the presence of media according to the invention.

The invention is now further described with particular reference to the following non-limiting examples which illustrate the capabilities of the media of the invention for effective removal of contaminants from hydrocarbon streams.

EXAMPLE 1

A sol was made by mixing 450 gm of boehmite sold by LaRoche Chemicals under the Trade Mark "VERSAL®" were mixed with 200 gm of deionized water. In this sol were dispersed 50 gm of dolomitic limestone available from National Lime and Stone Company as Bucyrus Microfine and the sol was peptized by the addition of 22.5 gm of formic acid dissolved in 200 gm of deionized water. The mix was then extruded in a coil press and the resulting coil was extruded again through a die to give a strand that was cut into one quarter inch long pellets or rods. These rods were dried at a little over 100° C. for about 10 hours. They were then fired in a kiln at 700° C. for a period of about an hour.

The BET surface area of the media obtained was measured at 219 $m^2/gm$, the apparent porosity was 78.5%, the water absorption was 103.4%, the apparent specific gravity was 3.54 gm/cc and the material density was 0.76 gm/cc. Analysis of the material showed 92.2% by weight of alumina, 6.6% by weight of calcia and 1.2% by weight of magnesia.

Several more samples were made in different forms from essentially the same mix and in one case with a slightly different firing schedule. Also in Sample #3, a corn starch temporary binder was added to the slurry at a level of 5% by weight based on the dry solids weight in the slurry. The process and properties of the media are set forth in the following Table.

| SAMPLE | #1 | #2 | #3 | #4 | #5 | #6 | #7 |
|---|---|---|---|---|---|---|---|
| SHAPE | ROD | RING | RING | RING | RING | RING | ROD |
| Diam. | — | 6.4 mm | 37 mm | 38.1 mm | 38.4 mm | 3.56 mm | 3.15 mm |
| ID | — | — | 27.2 mm | — | 28.2 mm | 1.52 mm | |
| Length | 6.4 mm | | 30.5 mm | — | 36.8 mm | 3.81 mm | 3.99 mm |
| SA cc/gm | 219 | 238 | 274 | 199 | 228 | 242 | 212 |
| Poros. % | 78.5 | 77.6 | 77.7 | 80.6 | 79 | 82.2 | 81.8 |
| $H_2O$ Ab. % | 103.4 | 99.5 | 103.4 | 113.3 | 110.6 | 140.9 | 128.3 |
| App. SG | 3.54 | 3.48 | 3.38 | 3.62 | 3.42 | 3.28 | 3.52 |
| Mat. Dens. | 0.76 | 0.78 | 0.76 | 0.71 | 0.72 | 0.59 | 0.64 |
| FPCS rod | 13.2 kg | | | | | | 3.18 kg |
| FPCS ring | | 2 kg | 5.9 kg | 4.54 kg | 4.54 kg | 0.45 kg | |
| Dry Temp. | 100° C. | 100° C. | 100° C. | 100° C. | 100° C. | 100° C. | 100° C. |
| Dry Time | 10 hr | 10 hr | 10 hr | 10 hr | 10 hr | 10 hr | 10 hr |
| Fire Temp | 700° C. | 700° C. | 700° C. | 800° C. | 700° C. | 700° C. | 700° C. |
| Fire Time | 1 hr | 1 hr | 1 hr | 1 hr | 1 hr | 1 hr | 1 hr |

In the above Table: "$H_2O$ Ab%." means water absorption percentage

"Poros" means apparent porosity

"App.SG" means apparent specific Gravity

"Mat. Dens." means material density

"FPCS" indicates the flat pate crush strength measured according to ASTM D-4179

This demonstrates that the above formulation can be fired to produce media with a high surface area in a variety of sizes and shapes with a reasonable crush strength if the right sizes are chosen.

From these samples, #1 was selected to be evaluated in the removal of phosphate contaminants from a hydrocarbon stream. The evaluation was performed by distilling oil which had been deliberately contaminated by the addition of tri-decyl phosphate such that the phosphorus content was 0.4 mmole (or 78 ppm). The contaminated oil was distilled in a 500 ml. flask in the presence of 4% by weight of media made from. the formulation under investigation. The fractions boiling in three temperature ranges were examined: 20–65° C.; 65–370° C. and 370° C. and higher for contamination.

The amounts of phosphorus measured in these ranges were: none; 0.3 ppm and 0.5 ppm. Barely a trace of residue remained.

In a different experiment the same media were used to evaluate iron and phosphorus removal from an oil over a protracted period. The results are shown in FIG. 1 and indicate that, even after 138 hours, the phosphate level was reduced to a low and acceptable level and the iron remained at essentially zero. It is calculated from this data that 2000 gm of the media could treat 6400 m$^3$ of contaminated oil before they would need to be regenerated.

In addition Sample #5 was evaluated using the same procedure. The phosphate removal achieved by 8 gm of the media was initially >90% and was still >75% after 200 hours of flow during which 46.3 kg of oil containing 47 ppm of phosphate were treated. In the same period the amount of iron contamination removed, which was initially at a level of 26 ppm, was initially over 90% and after 200 hours had risen to 95%. The media were then regenerated by heating the media in steam and after that, no trace of iron, zinc or lead remained in the media.

Figure 2:
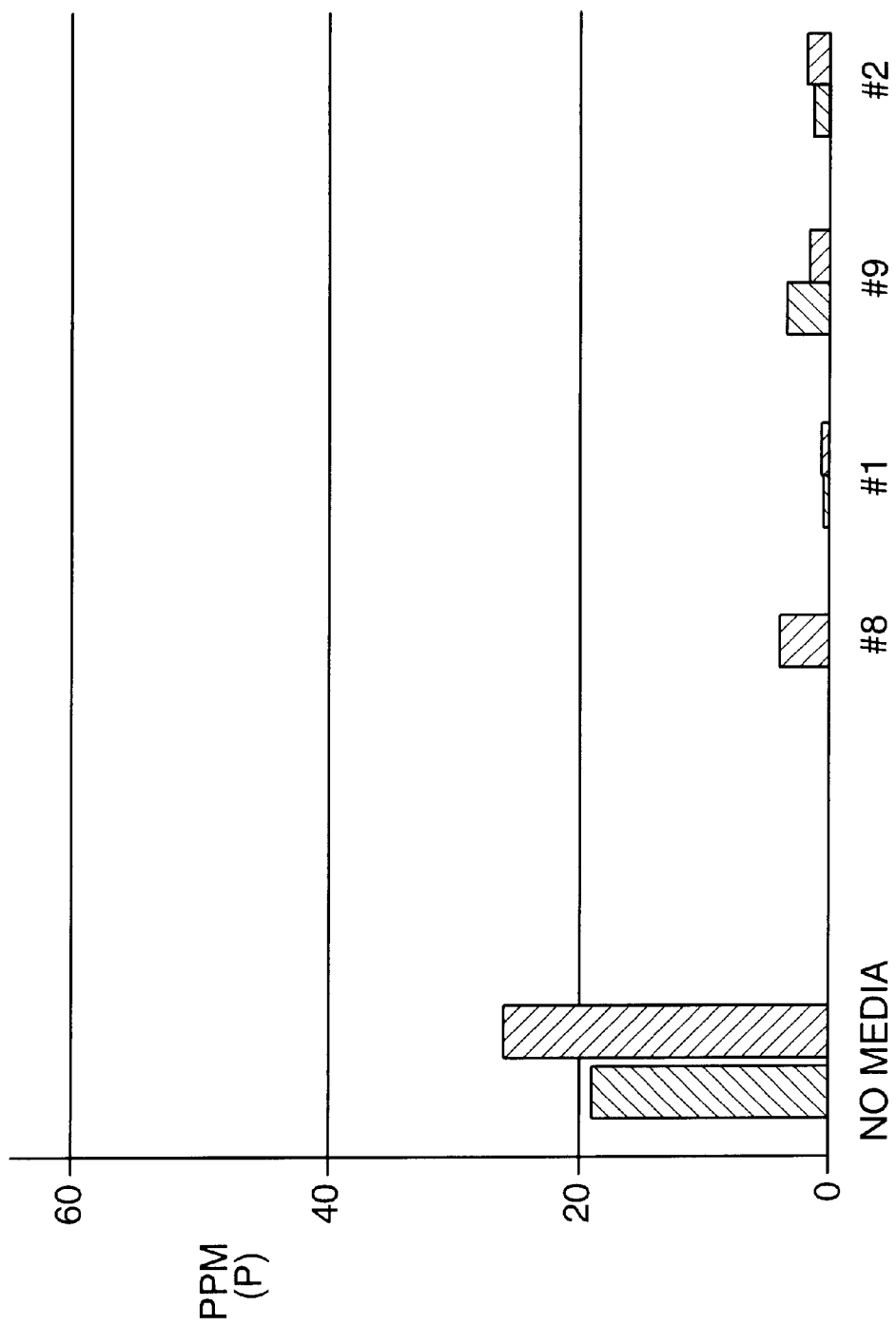
FIG. 2 is a bar graph showing the amounts of phosphorus in distillate and residue after being distilled in the presence of various media.

Finally Samples #1 and #5 and a repeat of Sample #5 were evaluated alongside a sample containing no media at all. In each case the same amount of oil contaminated with 78 ppm of phosphorus was distilled. The results which are shown in FIG. 2 indicate clearly that the media were effective in binding up the phosphorus since the bulk of it was to be found neither in the distillate nor in the residue in the flask.

EXAMPLE 2

In this Example a further series of media were made using essentially the process described in Example 1 with the minor difference discussed below. The products were examined to determine their physical properties which are recorded in the following Table.

| SAMPLE | #8 | #9 | #10 |
|---|---|---|---|
| SHAPE | ROD | RING | RING |
| SA cc/gm | 109 | 115 | 112 |
| Poros. % | 66.3 | 67.6 | 79.4 |
| H$_2$O Ab. % | 63.5 | 68.7 | 103.1 |
| App.SG | 3.1 | 3.04 | 3.75 |
| Mat. Dens. | 1.05 | 0.99 | 0.77 |
| FPCS rod | 18 kg | | |
| FPCS ring | | 2.7 kg | 2.5 kg |
| Dry Temp. | 100° C. | 100° C. | 100° C. |
| Dry Time | 10 hr | 10 hr | 10 hr |
| Fire Temp | 700° C. | 700° C. | 1000° C. |
| Fire Time hr | 1 hr | 1 hr | 1 hr |

In Sample #8, the Versal boehmite component was mixed with 50% by weight of dolomitic limestone and the dispersion was peptized with 2.5% by weight of formic acid.

In Sample #9, the same solid components were used in the same percentages as in Sample #8 but the formic acid addition was doubled to 5%. In Sample #10, only 10% of dolomitic limestone was added to the Versal boehmite and 4.5% of the formic acid was used.

We claim:

1. Absorbent media comprising from 50 to 96% by weight of alumina and from 50 to 4% by weight of alkaline earth metal oxides selected from calcia and magnesia present in calcia to magnesia weight ratios of from 90:10 to 50:50, said media having a BET surface area of at least 100 m$^2$/gm.

2. Media according to claim 1 having an apparent porosity of from 60 to 80%.

3. Media according to claim 1 with less than 1% of other metallic or metallic oxide impurities.

4. A method of making absorption media which comprises:
   a) forming a peptized aqueous slurry mixture of from 50–97% by weight of a boehmite with from 50 to 3% by weight of a mixture of calcium carbonate and magnesium carbonate wherein the relative weight proportions of the calcium and magnesium carbonates are from 10:1 to 50:50, the weights of the boehmite and carbonate mixture being based on the solids weight in the slurry;
   b) shaping the peptized slurry to form the desired media shapes; and
   c) drying to remove water and then firing the shapes at a temperature of 650 to 850° C.

5. A method according to claim 4 in which the drying is conducted at a temperature of less than 150° C.

6. A method according to claim 4 in which the firing is continued until there is no further loss of weight.

7. A method according to claim 4 in which the time of firing is controlled such that the final product has a surface area of at least 200 m$^2$/gm.

8. A method according to claim 4 in which the boehmite is peptized using an organic acid.

9. A method according to claim 8 in which the peptizing acid is formic acid.

10. A method according to claim 4 in which the components are added in amounts to yield a final product formulation comprising from 50 to 96% by weight of alumina and 50–4% by weight of alkaline earth metal oxides selected from calcia and magnesia wherein the weight proportion of calcia to magnesia is from 90:10 to 50:50.

* * * * *